Patented June 18, 1940

2,204,960

UNITED STATES PATENT OFFICE 2,204,960

3'-HALOGEN-BENZOYL-2-BENZOIC ACID-4'-SULPHONIC ACIDS AND PROCESS OF MAKING THE SAME

Sebastian Gassner and Berthold Bienert, Leverkusen-I. G. Werk, Germany, assignors to General Aniline & Film Corporation, a corporation of Delaware No Drawing. Application January 24, 1939, Serial No. 252,592. In Germany January 25, 1938

7 Claims. (Cl. 260—507)

The present invention relates to 3'-halogen-benzoyl-2-benzoic acid-4'-sulphonic acids and to a process of making the same.

These compounds can be represented by the formula:

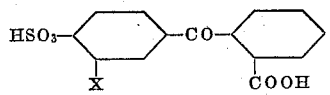

where X is halogen.

One object of our present invention is to provide a method for preparing 3'-halogen-benzoyl-2-benzoic acid-4'-sulphonic acids. Another object of our invention resides in the new compounds which are obtainable by our new process.

We have found that 3'-halogen-benzoyl-2-benzoic acid-4'-sulphonic acids are obtained by causing salts of 3',4'-dihalogen-benzoyl-2-benzoic acids to react with sulphites in aqueous solution. Preferably we start from an alkali metal salt of a 3',4'-dihalogen-benzoyl-2-benzoic acid which may be obtained by neutralizing the acid employed with an alkali liquor. As sulphite we preferably employ also an alkali sulphite. It could not be expected that only the halogen atom in 4'-position is replaced by the sulphonic acid group without replacing simultaneously the halogen atom in 3'-position as it was known that replacing a halogen atom in 4'-position makes a halogen atom in 3'-position more easily replaceable. Therefore the course of the reaction was surprising for a man skilled in the art. Also when the sulphite is employed in a large excess the halogen atom in 3'-position is not replaced.

As starting materials we preferably employ a salt of the 3',4'-dihalogen-benzoyl-2-benzoic acid itself. However, we may also start from compounds which are substituted in one or both nuclei. Thus, for instance, the benzoyl nucleus may be substituted by alkyl, carboxyl or hydroxy groups. The benzoic acid nucleus may carry, for instance, alkyl, aryl, carboxyl and hydroxy groups. The reaction proceeds in known manner by causing the starting material at an elevated temperature and, if necessary, at elevated pressure, to react with an alkali sulphite. The addition of a metal or a metal salt as, for instance, copper or a copper salt, may be advantageous in some cases.

Our new compounds represent valuable intermediate products for the production of dyestuffs. Thus, for instance, by the action of agents effecting ring closure they are transformed into the corresponding anthraquinone compounds. By subjecting, for instance, the 3'-halogen-benzoyl-2-benzoic acid-4'-sulphonic acid to the action of concentrated sulphuric acid at an elevated temperature the 2-chloro-anthraquinone-3-sulphonic acid is obtained which, for instance, by replacing the chlorine atom in 2-position is transformed in valuable starting materials for the production of dyestuffs.

The following example illustrates the invention without, however, restricting it thereto, the parts being by weight:

Example

A solution of 73.8 parts of 3',4'-dichloro-benzoyl-2-benzoic acid,
20.0 parts of a 50% caustic soda lye,
94.5 parts of crystallized sodium sulphite in
250 parts of water is heated in an autoclave at a temperature of 175° C. until in a test portion when acidified no starting material can be detected. When the reaction is finished the crude sodium salt of the 3'-chlorobenzoyl-2-benzoic acid-4'-sulphonic acid which corresponds to the following formula

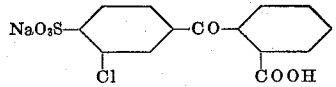

may be obtained in a simple manner by evaporation. The reaction mixture may also be acidified to a mineral acid reaction and the 3'-chlorobenzoyl-2-benzoic acid-4'-sulphonic acid separated as acid alkali salts, for instance by salting out with sodium or potassium chloride. Colorless crystals are obtained being easily soluble in water and diluted alkali lyes.

Instead of sodium sulphite other sulphites, for instance potassium sulphite, may be employed.

We claim:

1. The process which comprises causing a salt of a 3',4'-dihalogen-benzoyl-2-benzoic acid to react with a sulphite in aqueous solution.

2. The process which comprises causing an alkali metal salt of a 3',4'-dihalogen-benzoyl-2-benzoic acid to react with an alkali metal sulphite in aqueous solution.

3. The process which comprises causing an alkali metal salt of a 3',4'-dihalogen-benzoyl-2-benzoic acid to react with an alkali metal sulphite in aqueous solution at a temperature above 100° C. in an autoclave.

4. The process which comprises causing an alkali metal salt of the 3',4'-dichloro-benzoyl-2- benzoic acid to react with an alkali metal sulphite in aqueous solution.

5. The process which comprises causing an alkali metal salt of the 3′,4′-dichloro-benzoyl-2-benzoic acid to react with an alkali metal sulphite in aqueous solution at a temperature above 100° C. in an autoclave.

6. 3′-halogen-benzoyl-2-benzoic acid-4′-sulphonic acids.

7. The compound of the following formula

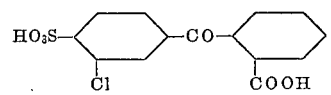

SEBASTIAN GASSNER.
BERTHOLD BIENERT.